United States Patent
Williams et al.

(10) Patent No.: US 11,007,718 B2
(45) Date of Patent: May 18, 2021

(54) SUPPLYING BUILD MATERIAL

(71) Applicant: Hewlett-Packard Development Company, L.P., Houston, TX (US)

(72) Inventors: Kenneth R. Williams, Vancouver, WA (US); Kurt F. Olsen, Vancouver, WA (US); Wesley R. Schalk, Camas, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 256 days.

(21) Appl. No.: 15/759,491

(22) PCT Filed: Dec. 3, 2015

(86) PCT No.: PCT/US2015/063732
§ 371 (c)(1),
(2) Date: Mar. 12, 2018

(87) PCT Pub. No.: WO2017/095416
PCT Pub. Date: Jun. 8, 2017

(65) Prior Publication Data
US 2019/0111627 A1    Apr. 18, 2019

(51) Int. Cl.
*B29C 64/393*    (2017.01)
*B29C 64/153*    (2017.01)
(Continued)

(52) U.S. Cl.
CPC .......... *B29C 64/393* (2017.08); *B29C 64/153* (2017.08); *B29C 64/214* (2017.08);
(Continued)

(58) Field of Classification Search
CPC ... B29C 64/393; B29C 64/321; B29C 64/214; B29C 64/153; B33Y 10/00; B33Y 30/00; B33Y 50/02; B33Y 40/00; B29K 2077/00
See application file for complete search history.

(56) References Cited

U.S. PATENT DOCUMENTS

| 7,879,393 | B2 * | 2/2011 | Ederer | .................... B29C 41/12 |
|---|---|---|---|---|
| | | | | 427/203 |
| 7,887,316 | B2 | 2/2011 | Cox | |

(Continued)

FOREIGN PATENT DOCUMENTS

| JP | 2003245981 | | 9/2003 | |
|---|---|---|---|---|
| JP | 2015-150804 | * | 8/2015 | ............. B29C 67/00 |

(Continued)

OTHER PUBLICATIONS

International Search Report and Written Opinion dated Jul. 18, 2016, PCT Patent Application No. PCT/US2015/063732, filed Dec. 3, 2015, Korean Intellectual Property Office.

(Continued)

*Primary Examiner* — Nahida Sultana
(74) *Attorney, Agent, or Firm* — HP Inc. Patent Department (57) ABSTRACT

According to one example, there is provided a three-dimensional printing system that comprises first and second build material supports adjacent to opposite sides of a build platform, when installed, a distributor to distribute build material, and a spreader for spreading build material. The three-dimensional printing system also comprises a controller to control the distributor to form a pile of build material before a first side of the build platform, to control the spreader to spread across the build platform and to form a pile of excess build material beyond a second side of the build platform, to control the spreader to move to the other side of the pile of excess build material, and to control the spreader to spread the pile of excess build material across the build platform to form a pile of excess build material on the first side of the build platform.

11 Claims, 8 Drawing Sheets

(51) Int. Cl.
*B29C 64/214* (2017.01)
*B33Y 30/00* (2015.01)
*B33Y 50/02* (2015.01)
*B29C 64/321* (2017.01)
*B33Y 10/00* (2015.01)
*B33Y 40/00* (2020.01)
*B29K 77/00* (2006.01)

(52) U.S. Cl.
CPC ............ *B29C 64/321* (2017.08); *B33Y 10/00* (2014.12); *B33Y 30/00* (2014.12); *B33Y 50/02* (2014.12); *B29K 2077/00* (2013.01); *B33Y 40/00* (2014.12)

(56) References Cited

U.S. PATENT DOCUMENTS

| | | | |
|---|---|---|---|
| 10,343,215 B2 * | 7/2019 | Pialot, Jr. | ............... B22F 3/1055 |
| 10,357,827 B2 * | 7/2019 | Shaw | .................... B29C 64/321 |
| 10,406,749 B2 * | 9/2019 | De Lajudie | ............. B29C 64/10 |
| 10,792,861 B2 * | 10/2020 | Philippi | ................. B23K 26/34 |
| 2004/0003741 A1 | 1/2004 | Iskra et al. | |
| 2005/0263934 A1 | 12/2005 | Chung et al. | |
| 2005/0280185 A1 | 12/2005 | Russell et al. | |
| 2006/0061618 A1 | 3/2006 | Hernandez et al. | |
| 2007/0074659 A1 * | 4/2007 | Wahlstrom | ............ B29C 64/153 118/679 |
| 2011/0211016 A1 | 9/2011 | Davidson et al. | |
| 2013/0108726 A1 * | 5/2013 | Uckelmann | ............ B33Y 10/00 425/174.4 |
| 2017/0173886 A1 * | 6/2017 | Menchik | .................. B29C 64/20 |
| 2018/0111314 A1 * | 4/2018 | Philippi | .................. B33Y 10/00 |
| 2018/0147786 A1 * | 5/2018 | Hakkaku | ................ B33Y 30/00 |
| 2018/0200791 A1 * | 7/2018 | Redding | ................. B29C 64/153 |
| 2018/0222112 A1 * | 8/2018 | Danzig | ................. B29C 64/153 |
| 2020/0189191 A1 * | 6/2020 | Van Deest | ............ B29C 64/209 |
| 2020/0391293 A1 * | 12/2020 | Sheinman | ............ B29C 64/393 |

FOREIGN PATENT DOCUMENTS

| | | |
|---|---|---|
| JP | 2015150804 | 8/2015 |
| WO | WO-9828124 | 7/1998 |

OTHER PUBLICATIONS

Jean Le Bouthillier, "3D Printers: Technology Rundown", Aug. 14, 2015, Boots Industries, 14 pages. http://bootsindustries.com/portfolio-item/3d-printers-technology-rundown/.

* cited by examiner

SUPPLYING BUILD MATERIAL

CLAIM FOR PRIORITY

The present application is a national stage filing under 35 U.S.C. § 371 of PCT application number PCT/US2015/063732, having an international filing date of Dec. 3, 2015, the disclosure of which is hereby incorporated by reference in its entirety.

BACKGROUND

Additive manufacturing techniques, such as three-dimensional (3D) printing, enable objects to be generated on a layer-by-layer basis. 3D printing techniques may generate layers of an object by forming successive layers of a build material on a build platform, and selectively solidifying portions of each layer of the build material.

BRIEF DESCRIPTION

Examples will now be described, by way of non-limiting example only, with reference to the accompanying drawings, in which.

DETAILED DESCRIPTION

Some 3D printing systems use build material that have a powdered, or granular, form. According to one example a suitable build material may be a powdered semi-crystalline thermoplastic material. One suitable material may be Nylon 12, which is available, for example, from Sigma-Aldrich Co. LLC. Another suitable material may be PA 2200 which is available from Electro Optical Systems EOS GmbH.

In other examples other suitable build materials may be used. Such materials may include, for example, powdered metal materials, powdered plastics materials, powdered composite materials, powdered ceramic materials, powdered glass materials, powdered resin material, powdered polymer materials, and the like. Different powders may have different characteristics, such as different average particle sizes, different minimum and maximum particle sizes, different coefficients of friction, different angles of repose, and the like. In some examples non-powdered build materials may be used, such as gels, pastes, and slurries.

Such 3D printing systems typically provide, along a side of a build platform, a quantity of build material to be spread over the build platform to form a thin layer of build material on the build platform. Portions of the layer of build material may then be solidified, using any suitable solidification technique, such as fusing agent deposition and heating systems, binder agent deposition systems, laser sintering systems, and the like.

During a 3D printing operation, an initial layer of build material may be spread directly on the surface of a build platform, whereas subsequent layers of build material may be formed on a previously formed layer of build material. Herein, reference to forming a layer of build material on the build platform may refer, depending on the context, either to forming a layer of build material directly on the surface of the build platform, or to forming a layer of build material on a previously formed layer of build material.

Figure 1A:
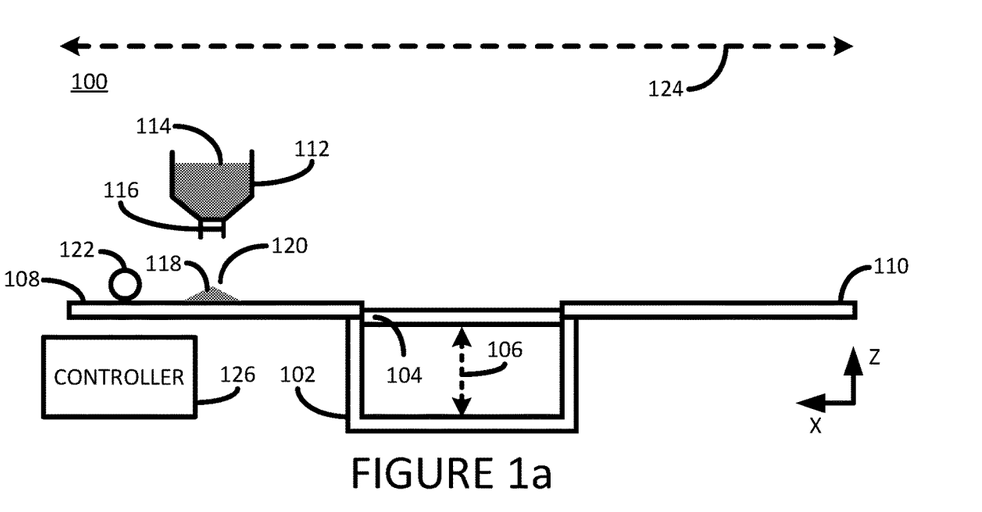
FIG. 1a is a side view illustration of a portion of a three-dimensional printing system according to one example.
Figure 1B:
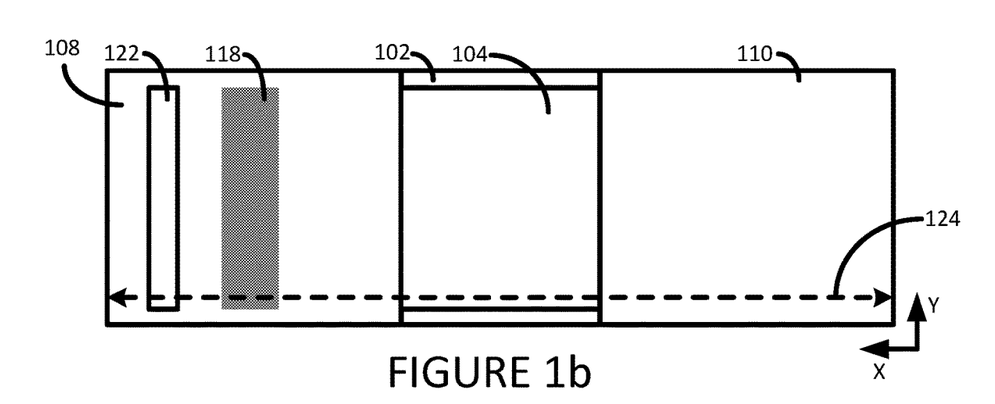
FIG. 1b is a top view illustration of a portion of a three-dimensional printing system according to one example.

Referring now to FIG. 1a there is shown a side view illustration of a portion of a 3D printing system 100 according to one example. FIG. 1b shows a corresponding top view illustration of the system 100. For clarity reasons not all the elements of the 3D printing system 100 are shown. For example, the illustrations shown herein do not show any specific build material solidification systems, although any suitable build material solidification systems may be used, such as fusing agent deposition systems, heating systems, electromagnetic energy sources, binder agent deposition systems, laser sintering systems, and the like.

The system 100 comprises a build module 102 in which a 3D object may be generated by the system 100. In one example the build module 102 may be removable. The build module 102 comprises a movable build platform 104 which is movable vertically, in the z-axis, 106 to enable the height of the build platform 104 to be precisely controlled. For example, the build platform 104 may be controllable to be lowered by a small amount, such as around 100 microns, to enable a layer of build material to be formed thereon.

Adjacent to a first side of the build module 102 there is provided a first build material support 108, and adjacent to a second side of the build module 102 there is provided a second build material support 110. In one example the first and second build material supports 108 and 110 are located on opposite sides of the build module 102, when the build module 102 is present. The system 100 may comprise a suitable interface to receive the build module 102 and to allow the build module 102 to be removed.

The system 100 further comprises a build material distributor 112 to selectively deposit a quantity of build material 114 stored within the build material distributor 112 onto the first build material support 108 at a build material distribution zone 120. In the example shown the build material distributor 112 is positioned generally vertically above the distribution zone 120, although in other examples the build material distributor 112 may be positioned in other appropriate positions.

In the example shown, the build material distributor 112 forms a pile 118 of build material in the distribution zone 120. The quantity of build material deposited from the build material distributor 112 may be controllable using a suitable valve 116, such as a rotary valve. Although not visible in FIG. 1b, in one example the build material distributor 112 has a build material output that, in one example, has the same length (in the y-axis) as the build platform 104. This is to allow the build material distributor 112 to form a pile 118 of build material along the length of the build material support 108. In another example, the build material distributor 112 could be movable, in the y-axis, across the build material support 108 to enable a pile 118 of build material to be formed along the length (in the y-axis) of the build support 108.

In one example the build material distributor 112 forms a pile 118 of build material that has a substantially uniform cross-section along its length.

The system 100 also comprises a build material spreader 122 to move or spread the pile 118 of build material across the build platform 104 to form a layer of build material thereon. In one example the build material spreader 122 is a roller, although in other examples other suitable spreader mechanisms, such as a wiper blade, may be used.

The build material spreader 122 is movable bi-directionally along the first build material support 108, over the build platform 104, and along the second build material support 110, as indicated by arrow 124. The build material spreader 122 may be mounted on a movable carriage, gantry, or other suitable mechanism. The spreader 122 has a first vertical operational height where the spreader 122 may rest on, or contact, one of the build material supports 108 and 110. The spreader 122 may also be selectively positioned, in a second vertical operational height as will be described further below. In the second operational height the base of the build material spreader 122 is positioned above the surface of first and second build material supports 108 and 110.

If the build material spreader 122 is in direct contact with a surface it will move build material along that surface, and will leave no, or very little, build material behind the spreader. If, however, the build material spreader 122 is not in direct contact with a surface it will spread build material along that surface and form a layer of build material that has a thickness equivalent to the height of the base of the spreader 122 above that surface. When spreading, the build material spreader 122 may also move a quantity of excess build material that is not spread.

Figure 2:
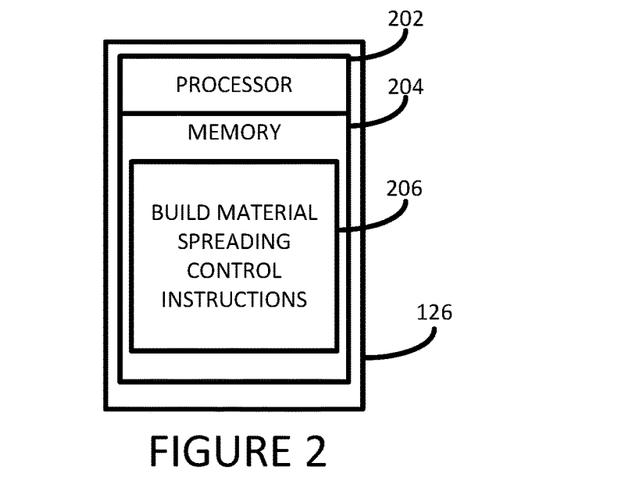
FIG. 2 is a block diagram of a printing system controller according to one example.

A controller 126 controls the general operation of the system 100 and different elements thereof, as described below. Details of the controller 126 are illustrated in FIG. 2.

The controller 126 comprises a processor 202 coupled to a memory 204. The memory 204 stores build material supply management instructions 206 that, when executed by the processor 202, control the system 100 to manage the supply of build material, as described herein.

Example operation of the 3D printing system 100 will now be described with reference to the flow diagrams of FIGS. 3a to 3c, FIGS. 4a to 4e, and FIGS. 5a and 5b.

Initially, the controller 126 controls the build material spreader 122 to be positioned in its first operational height, and to be positioned horizontally, in a first predetermined position 402, to the left (as viewed in FIG. 1a) of the build material distribution zone 120. The controller 126 may also control the build platform 104 to lower by a small amount to allow the generation of a layer of build material thereon.

Figure 3A:
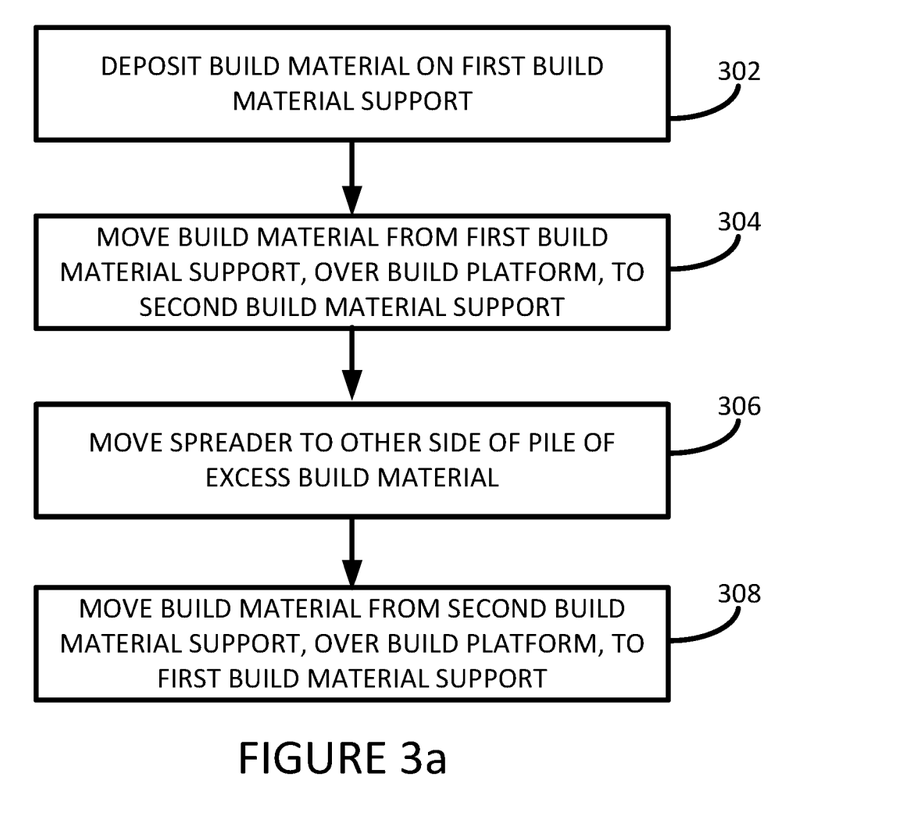
FIGS. 3a to 3c are flow diagrams outlining example methods of operating a three-dimensional printing system according to various examples.

At block 302, the controller 126 controls the build material distributor 112 to form a pile 118 of build material in the distribution zone 120. In one example, the quantity of build material distributed by the build material distributor 112 is a predetermined quantity, for example based on the size of the build platform 104 and the height of each layer of build material that is to be selectively solidified. In one example, the quantity of build material distributed may be based on the length of time the valve 116 is opened.

Figure 4A:
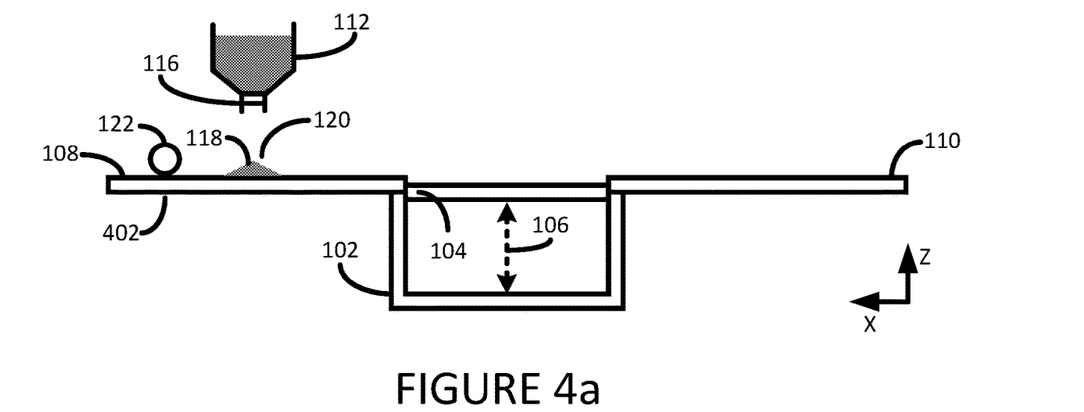
FIGS. 4a to 4e are side view illustrations of a portion of a three-dimensional printing system according to one example.
Figure 4B:
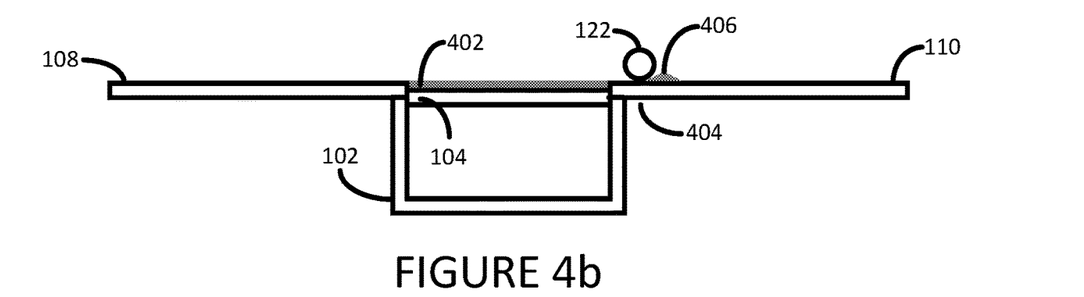

At block 304, the controller 126 controls the spreader 122 to move in a first direction, in a first pass, across the support platform 108, over the build platform 104, and to a second predetermined position 404 on the support platform 110, as illustrated in FIG. 4b. Moving the spreader 122 in this way causes substantially all of the pile 118 of build material to be removed from the support 108, and for a layer 402 of build material to be formed on the build platform 104. The thickness of the layer 402 is dependent on the height at which the top of the build platform (or the top of uppermost layer of build material on the build platform) is below the surface level of the support 108. A pile 406 of excess build material is left in front of the spreader 122 when the spreader 122 stops moving.

Figure 4C:
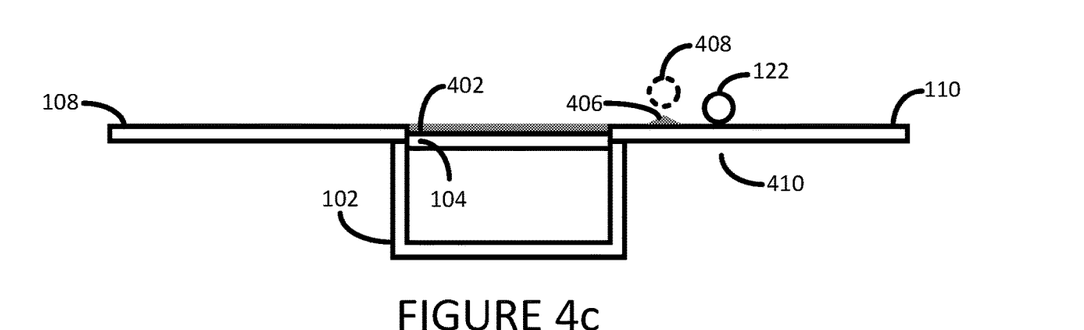

At block 306, the controller 126 controls the spreader 122 to move to the other side of the pile 406 of excess build material, as shown in FIG. 4c.

In one example, as illustrated in FIG. 4c, the controller 126 controls the spreader 122 to move to the other side of the pile 406 of excess build material without touching the pile 406 of build material. For example, the controller may control the spreader 122 to move into a second operational height 408 at which the spreader 122 is positioned above the height of the pile 406, to move the spreader 122 over the pile 406, and to control the spreader 122 to move back into its first operational height, at a third predetermined position 410.

Figure 5A:
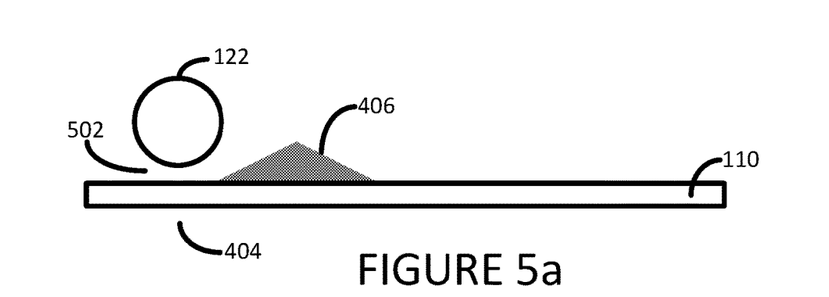
FIGS. 5a and 5b are side view illustrations of a portion of a three-dimensional printing system according to one example.
Figure 5B:
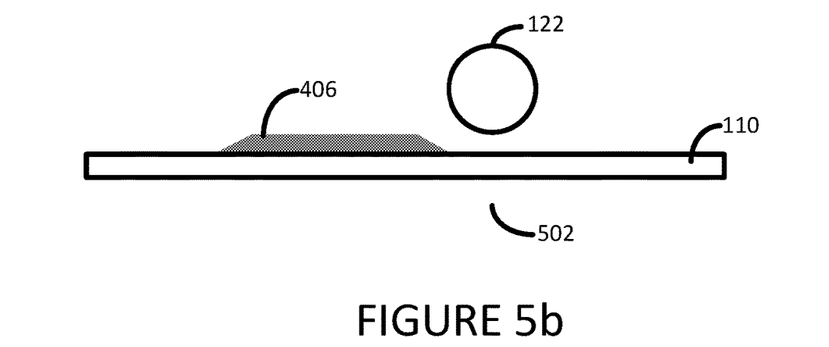

In another example, illustrated in FIGS. 5a and 5b, the controller 126 controls the spreader 122 to move to the other side of the pile 406 of excess build material by moving through a portion of the pile 406 of build material. For example, the controller 126 may control the spreader 122 to move into a second operational height 502 at which the base of the spreader 122 is positioned above the surface of the support 110, but below the height of the top of pile 406. In this example, the controller 126 controls the spreader 122 to move to a fourth predetermined position 502, which causes the pile 406 to be spread over a portion of the support platform 110. The controller 126 may then control the spreader 122 to be positioned at the first operational height. Spreading the pile 406 of build material in this way may help keep the temperature of build material within the pile 406 more stable, for example by enabling it to absorb heat from the atmosphere or from energy sources used.

The height to which the controller 126 controls the spreader 122 to move to in its second operational height may, in one example, be a fixed predetermined height at which it has been predetermined that the base of the spreader 122 should not touch the pile 406 of build material. In another example, the controller 126 may determine the height to which the base of the spreader 122 should be positioned so as to not touch the pile 406, for example based on characteristics that may include: the quantity of build material in the original pile 118; the dimensions of the build platform 104; and the height of each layer of build material to be formed on the build platform.

In one example the spreader 122 may have multiple second operational heights, such as a position at which the base of the spreader 122 does not contact the top of the pile 406, and a further position at which it does touch the pile 406. In this example the controller 126 may, depending on certain criteria, either control the spreader 122 to either touch or not to touch the pile 406.

Figure 4D:
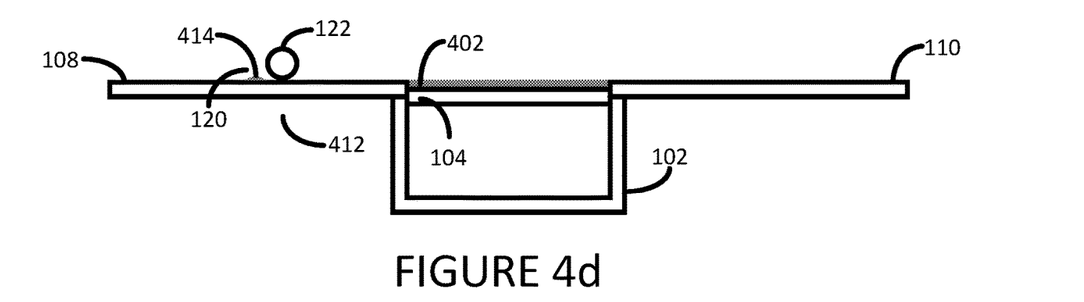

At block 308 the controller 126 controls the spreader 122 to move in a second direction opposite the first direction, in a second pass, to move the pile 406 of build material across the support platform 110, over the build platform 104, and across the support platform 108 to a fourth predetermined position 412, as illustrated in FIG. 4d. A small pile 414 of excess build material may be left in front of the spreader 122, as shown in FIG. 4d. In one example the fourth predetermined position 412 is such that the pile 414 of build material is left in the build material distribution zone 120.

In the example described above the build platform 104 is not lowered between the first and second pass of the spreader 122. This may be useful in some circumstances, for example depending on characteristics of the build material used, to help ensure that a uniform layer of build material is formed on the build platform 104. In this example, after the second pass of the spreader 122 a suitable 3D printing technique may be performed, as described above, to selectively solidify a portion of the layer of build material.

Figure 3B:
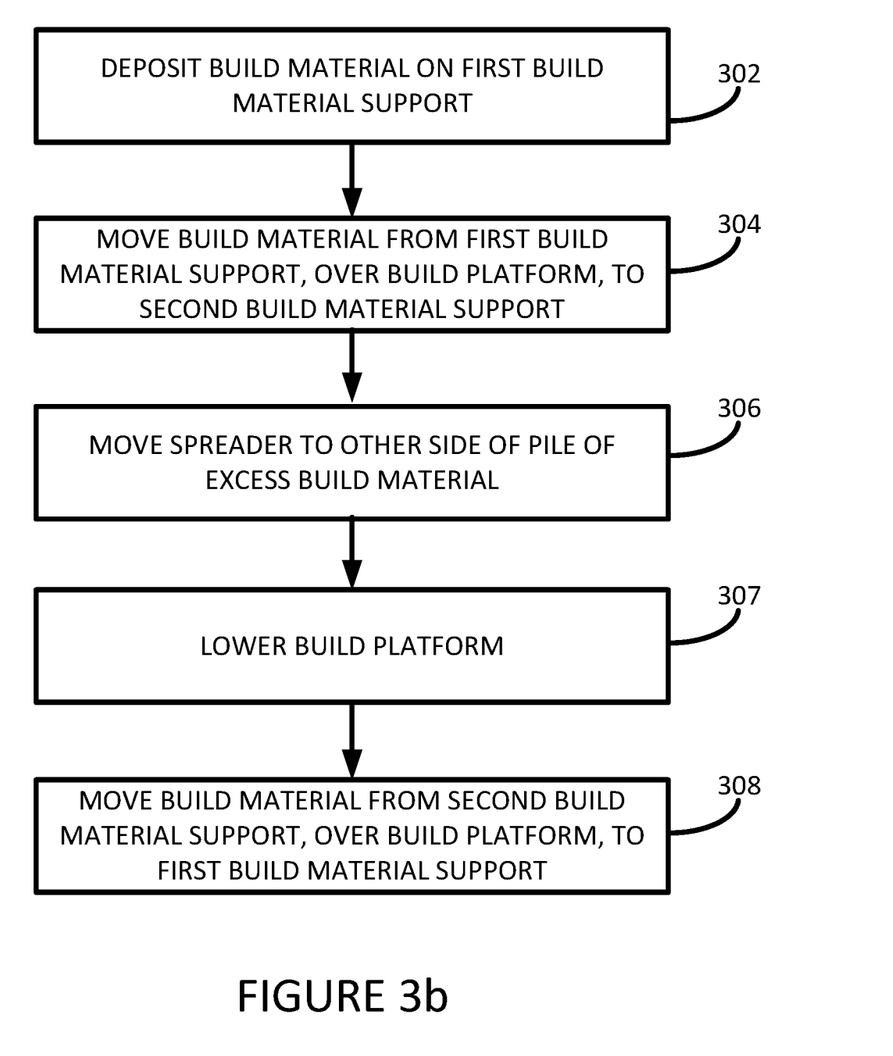

In another example, as shown in FIG. 3b, at block 307, which is performed intermediate blocks 306 and 308, the controller 126 controls the build platform 104 to lower before the second pass is performed. This may be used, for example, when a single pass of the spreader 122 is able to create an acceptable layer of build material on the build platform 104. In this example, after each pass of the spreader 122 a suitable 3D printing technique may be performed, as described above, to selectively solidify a portion of the layer of build material on the build platform 104.

Figure 3C:
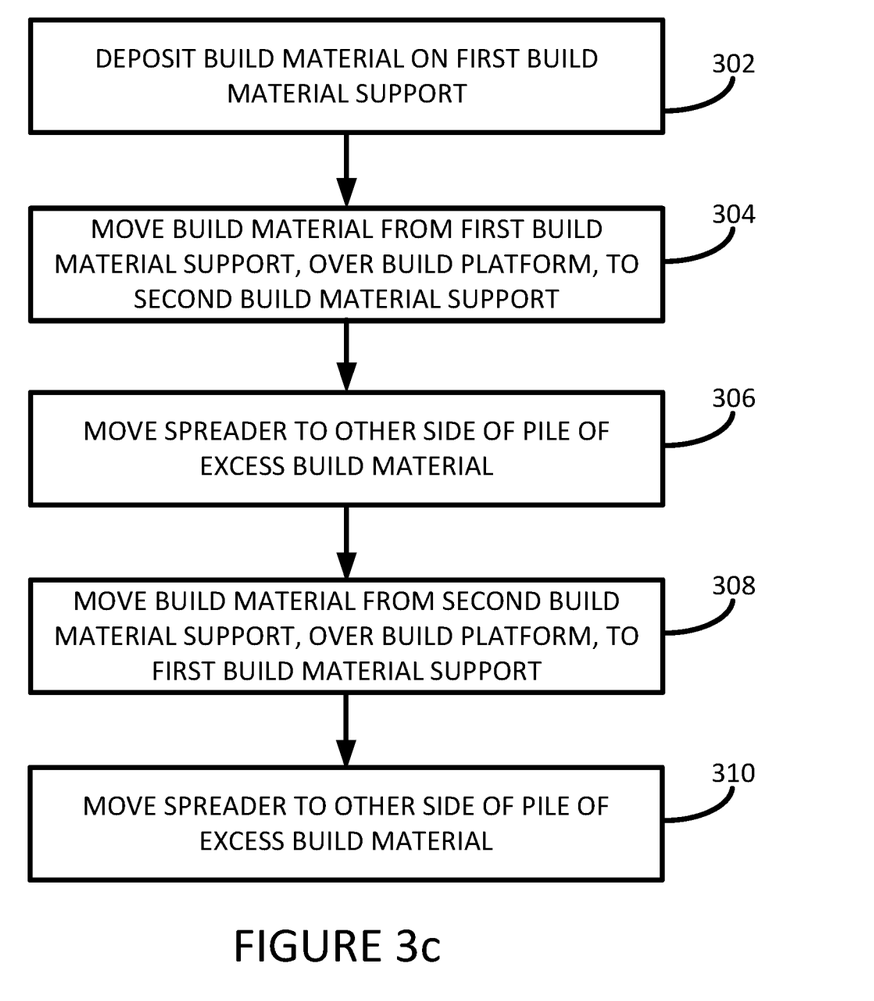
Figure 4E:
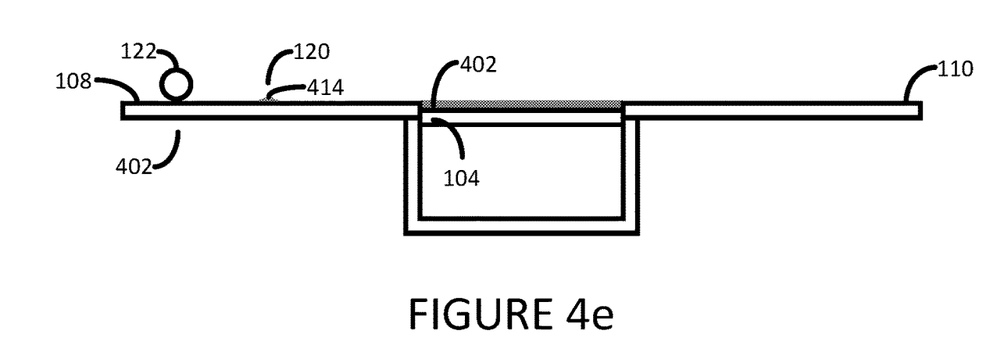

In another example, as shown in FIG. 3c, in which the processor 126 may or may not process block 307, the processor 126 may, after performing block 308, at block 310 control the spreader 122 to move to the other side of the pile 414, and back to its first predetermined position 402, as shown in FIG. 4e. In one example this is achieved by moving the spreader 112 to its second operational height, so that the pile 414 of build material is not disturbed.

The processor 126 may then return to block 302 to control the build material distributor 112 to deposit build material in the deposition zone of the support 108, and to continue as described above until the desired number of layers of build material have been formed on the build platform 106 and suitably processed. In one example, the processor 126 may estimate the quantity of build material in the pile 414, for example using data relating to the height of layer of build material formed 402 or data relating to the portions of the previous layer that were selectively solidified. Using the estimated quantity of build material in the pile 414 the processor 126 may control the build material distributor 112 to deposit a quantity of build material such that the quantity of build material in pile 118 is substantially constant between passes.

In a further example, a build material distributor 602, as illustrated in the cross-section illustrations in FIGS. 6a to 6d, may be used in place of the build material distributor 112. As for the build material distributor 112, the build material distributor 602 may have generally the same length (in the y-axis) as the build platform 104. The build material distributor 602 comprises a volume 604 for storing build material, such as build material 114. The build material distributor 602 comprises a valve 606 to control the deposition of build material 114 from the volume 604. The build material distributor 602 further comprises an open prism-shaped distribution member 608. The shape of the distribution member 608 may be based, in one example, on the angle of repose or other appropriate characteristics of the build material intended to be used with the build material distributor 602.

Figure 6A:
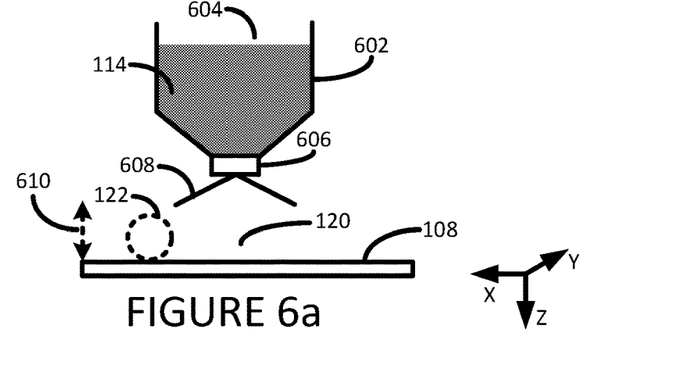
FIGS. 6a to 6d are side view illustrations of a portion of a three-dimensional printing system according to one example.

The build material distributor 602 is movable between a standby position, whereby the build material distributor 602 does not interfere with the operation of the spreader 122, and a distribution position, where the base of the build material distributor 602 is in contract with, or is proximal to, the upper surface of the build material support 108. By proximal is meant that the build material distributor 602 may be sufficiently close to the surface of the build material support 108, without touching it, such that build material distributed by the distributor 602

In one example, the build material distributor 602 is movable vertically, as indicated by arrow 610, between the standby position and the distribution position, although in other examples the build material distributor 602 may be movable in other ways, such as horizontally, or a combination or both horizontally and vertically.

Figure 7:
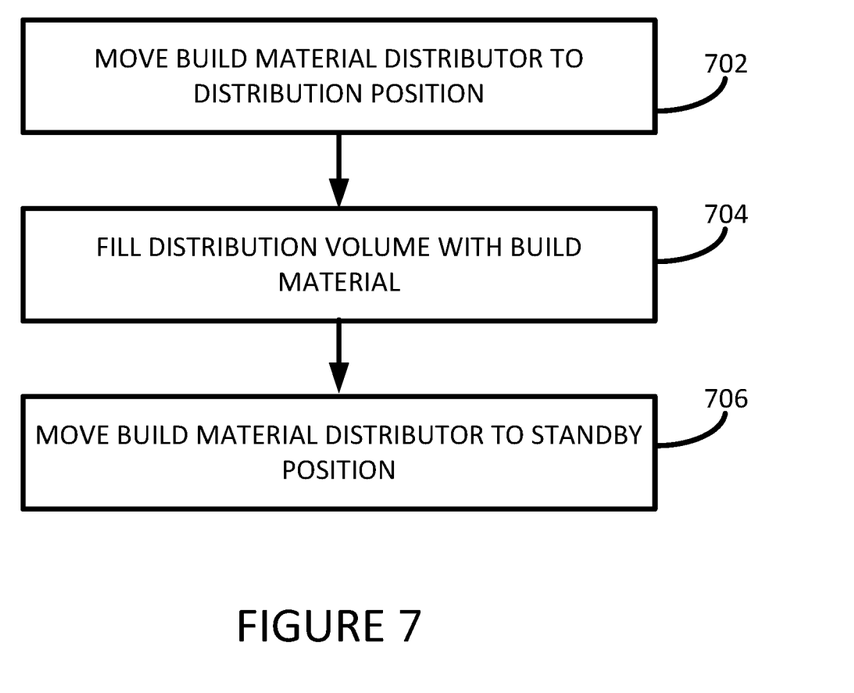
FIG. 7 is a flow diagram outlining an example method of operating a portion of three-dimensional printing system according to one example.

The build material distributor 602 may be controlled, for example by the controller 126, to cause a pile of a substantially predetermined quantity of build material to be formed on the build material support 108, as described below, and as shown in the flow diagram of FIG. 7.

Figure 6B:
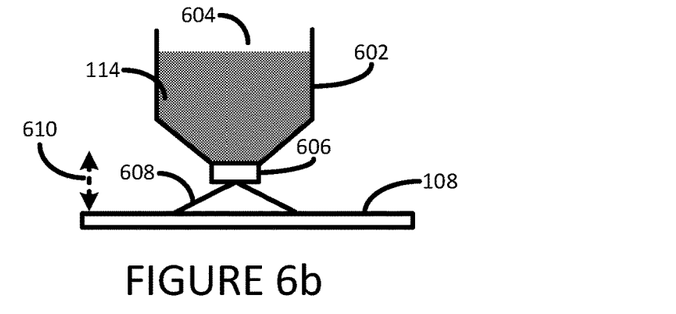

At block 702, the processor 126 controls the build material distributor 602 to move to the distribution position, as illustrated in FIG. 6b, where the base of the build material distributor 602 contacts the build material support platform 108. In this position, the distribution member 608 forms a closed distribution volume with the support platform 108, and a substantial seal is formed between the support platform 108 and the extremities of the distribution member 608. In another example, the processor 126 controls the build material distributor 602 to move to a distribution position where the base of the build material distributor 602 is proximal to, but is not in contact with, the build material support 108. In one example, proximal may be less than around 1 mm from the support 108, although in other examples higher distances may be used depending on the properties of the build material used.

Figure 6C:
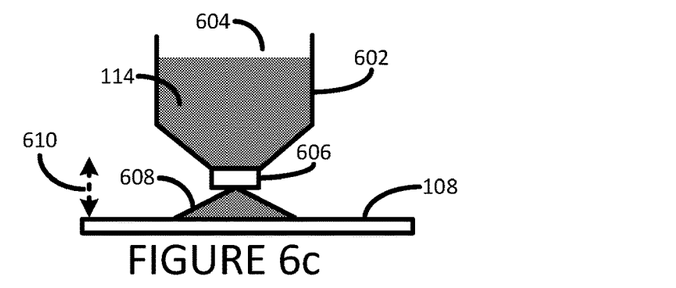

At block 704, the processer 126 controls the build material distributor 602 to fill the distribution volume with build material, as illustrated in FIG. 6c. In one example, this may be achieved by opening the valve 606 for a predetermined length of time to allow build material 114 within the volume 604 to fill the distribution volume. Once the distribution volume is filled, build material 114 stops flowing through the valve 606, and the valve 606 may be closed.

Figure 6D:
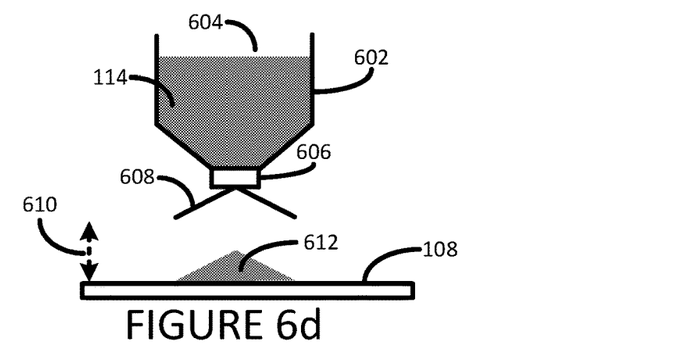

At block 706, the processor 126 controls the build material distributor 602 to move to its standby position, as illustrated in FIG. 6d. This leaves a pile 612 of build material that has substantially the volume of the distribution volume.

Such a build material distribution system is useful since the quantity of build material in the pile 612 is always the same, even if some build material, such as the pile 414, is left in the distribution zone 120. Furthermore, where such an existing pile of build material exists in the distribution zone, the amount of additional build material to be added to that existing pile is automatically distributed to the distribution volume, without having to perform any estimations of the quantity of build material in the existing pile, and without having to determine a quantity of build material to distribute from the build material distributor 602. This enables the existing pile of build material to be topped-up to a predetermined quantity of build material by the addition of a variable quantity of build material.

Furthermore, formation of the pile 612 of build material within the distribution member 608 helps reduce the amount of build material that may become airborne, and thus may help reduce powder contamination within and/or around the printing system 100.

In other examples the above described processes may be performed, where appropriate, in different orders, or some of the above-described processes may be performed in parallel, rather than sequentially. For example, in one example the controller 126 may control the build material distributor 112 to deposit a quantity of build material in the distribution zone 120 once the spreader 122 has moved the initially formed pile 118 of build material across the build platform 104. This may allow, for example, the temperature of the newly formed pile of build material to stabilize, and may the build material distribution process to be performed more quickly.

In a further example, the system 100 may additionally comprise an excess build material bin, for example positioned below the level of the build material support 108 and at the left-hand end thereof, to allow excess build material on the build material support to be moved into the bin, for example by the spreader 122. Such an operation may be performed periodically as a maintenance routine. Excess build material recuperated in the bin may be recycled or disposed as appropriate.

It will be appreciated that examples described herein can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are examples of machine-readable storage that are suitable for storing a program or programs that, when executed, implement examples described herein. Accordingly, some examples provide a program comprising code for implementing a system or method as claimed in any preceding claim and a machine readable storage storing such a program. Still further, some examples of the present invention may be conveyed electronically via any medium such as a communication signal carried over a wired or wireless connection.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. An apparatus for supplying build material to a three-dimensional printing system, comprising:
    a first build material support adjacent a first side of a build module;
    a second build material support adjacent a second side of the build module;
    a build material distributor;
    a build material spreader; and
    a controller to:
        control the build material distributor to form a pile of build material on the first build material support;
        control the build material spreader, while the build material spreader is at a first operational height, to spread the formed pile of build material in a first direction across the build module to form a pile of excess build material on the second build material support;
        control the build material spreader to move to a second operational height where a base of the build material spreader is above a surface of the second build material support and is below the height of the top of the pile of excess build material;
        control the build material spreader, while the build material spreader is at the second operational height, to move in the first direction to the other side of the pile of excess build material, wherein the build material spreader spreads the pile of excess build material on a portion of the second build material support as the build material spreader moves to the other side of the pile of excess build material in a direction away from the first build material support; and
        control the build material spreader to spread the pile of excess build material in a reverse direction across the build module toward the first build material support.

2. The apparatus of claim 1, wherein the build module comprises a movable build platform, and wherein the controller controls the build platform to be lowered before the build material spreader is controlled to spread in the reverse direction.

3. The apparatus of claim 1, wherein the build material spreader is movable between the first operational height where the base of the build material spreader contacts the build material support and the second operational height where the base of the build material spreader does not contact the second build material support.

4. The apparatus of claim 1, wherein the build material spreader is controlled to leave any excess build material in a predetermined zone on the first build material support to allow the build material distributor to deposit build material onto the pile of excess build material to form a new pile of build material.

5. The apparatus of claim 1, wherein the build material distributor is movable between a standby position, and a distribution position where the base thereof is one of: in contact with the build material support; or proximal to the build material support; to form a distribution volume.

6. The apparatus of claim 1, wherein the build material distributor forms a pile of build material having a substantially uniform cross-section and having a length substantially equal to the length of the build module.

7. A method of supplying build material to a three-dimensional printing system comprising:
    depositing, with a build material distributor, a quantity of build material on a first build material support to form a pile of build material;
    moving, with a build material spreader and while the build material spreader is at a first operational height, the formed pile of build material over a build platform to a second build material support, and leaving a pile of excess build material on the second build material support;
    moving the build material spreader to a second operational height where a base of the build material spreader is above the surface of the second build material support and is below the height of the top of the pile of excess build material;
    moving the build material spreader to an opposite side of the pile of excess build material on the second build material support while the build material spreader is at the second operational height to cause the build material spreader to spread the pile of excess build material on a portion of the second build material support as the build material spreader moves to the opposite side of the pile of excess build material in a direction away from the first build material support; and moving, with the build material spreader, the pile of excess build material over the build platform and to the first build material support.

8. The method of claim 7, further comprising, before moving the pile of excess build material, lowering the build platform to the first operational height to enable a layer of build material to be formed over the build platform.

9. The method of claim 7, further comprising, distributing additional build material on top of the pile of excess build material to form a pile of a predetermined quantity of build material.

10. The method of claim 9, wherein distributing additional build material comprises positioning the build material distributor to a form a distribution volume, and delivering build material within the distribution volume.

11. A 3D printing system comprising:
first and second build material supports adjacent to opposite sides of a build platform;
a distributor to distribute build material;
a spreader for spreading build material; and
a controller to:
control the distributor to form a pile of build material before a first side of the build platform;
control the spreader, while the spreader is at a first operational height, to spread the pile of build material across the build platform and to form a pile of excess build material beyond a second side of the build platform on the second build material support;
control the build material spreader to move to a second operational height where a base of the build material spreader is above a surface of the second build material support and is below the height of the top of the pile of excess build material;
control the spreader, while the spreader is at the second operational height, to move to an opposite side of the pile of excess build material, wherein the build material spreader spreads the pile of excess build material on a portion of the second build material support as the build material spreader moves to the opposite side of the pile of excess build material in a direction away from the first build material support; and
control the spreader to spread the pile of excess build material across the build platform to form a pile of excess build material on the first side of the build platform on the first build material support.

* * * * *